(12) United States Patent
Choi et al.

(10) Patent No.: US 8,891,643 B2
(45) Date of Patent: Nov. 18, 2014

(54) METHOD AND APPARATUS FOR ALLOCATING TRANSMISSION POWER IN MULTI INPUT MULTI OUTPUT SYSTEM

(75) Inventors: In Kyeong Choi, Daejeon-si (KR); Sok Kyu Lee, Daejeon-si (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 91 days.

(21) Appl. No.: 13/620,517

(22) Filed: Sep. 14, 2012

(65) Prior Publication Data

US 2013/0266054 A1  Oct. 10, 2013

(30) Foreign Application Priority Data

Apr. 9, 2012  (KR) .................. 10-2012-0036885

(51) Int. Cl.
| | | |
|---|---|---|
| H04K 1/10 | (2006.01) | |
| H04L 27/28 | (2006.01) | |
| H04W 52/24 | (2009.01) | |
| H04W 52/42 | (2009.01) | |

(52) U.S. Cl.
CPC ............ *H04W 52/243* (2013.01); *H04W 52/42* (2013.01)
USPC .......... 375/260; 375/224; 375/295; 455/127.1

(58) Field of Classification Search
CPC ... H04W 52/04; H04W 52/221; H04W 52/00; H04W 52/243; H04W 52/42; H04B 7/0426; H04B 7/0413; H04B 7/0443
USPC .......... 375/224, 259–260, 295, 377; 455/522, 455/59, 67.11, 574, 115.1, 127.1, 127.5
See application file for complete search history.

(56) References Cited

U.S. PATENT DOCUMENTS

| | | | | |
|---|---|---|---|---|
| 6,859,503 | B2 * | 2/2005 | Pautler et al. ................. | 375/299 |
| 7,983,353 | B2 * | 7/2011 | Grant et al. .................... | 375/267 |
| 8,620,373 | B2 * | 12/2013 | Ashikhmin et al. .......... | 455/522 |
| 2005/0013239 | A1 | 1/2005 | Agrawal et al. | |
| 2005/0130694 | A1 * | 6/2005 | Medvedev et al. ............ | 455/522 |
| 2007/0280387 | A1 * | 12/2007 | Li et al. ......................... | 375/347 |
| 2010/0062708 | A1 * | 3/2010 | Sangiamwong et al. ....... | 455/24 |
| 2010/0074364 | A1 * | 3/2010 | Kwon et al. ................... | 375/285 |
| 2010/0220811 | A1 * | 9/2010 | Semenov et al. .............. | 375/296 |
| 2013/0237265 | A1 * | 9/2013 | Khojastepour et al. ....... | 455/509 |

FOREIGN PATENT DOCUMENTS

KR   1020060064501 A   6/2006

OTHER PUBLICATIONS

Wei Yu, "Multiuser Water-filling in the Presence of Crosstalk", Information Theory and Applications Workshop, Jan. 29, 2007-Feb. 2, 2007, pp. 414-420, IEEE Conference Publications.

\* cited by examiner

*Primary Examiner* — Jean B Corrielus

(57) ABSTRACT

A method and apparatus for allocating transmission power in a transmission terminal having at least one antenna of a multi-input multi-output (MIMO) system are provided. The method includes: measuring inter-stream interference of a plurality of streams; measuring inter-user interference of a plurality of users; and determining the transmission power based on the inter-stream interference and the inter-user interference, wherein the transmission power is determined using an iterative water-filling algorithm in which the Karush-Kuhn-Tucker (KKT) system is iteratively applied to all of the plurality of streams and all of the plurality of users. According to the present invention, several receive antennas are mounted in the MIMO system, thereby making it possible to receive multiple streams. In addition, when the multiple streams are received, transmission power may be allocated to each transmission stream.

11 Claims, 2 Drawing Sheets

METHOD AND APPARATUS FOR ALLOCATING TRANSMISSION POWER IN MULTI INPUT MULTI OUTPUT SYSTEM

CROSS-REFERENCE TO RELATED APPLICATIONS

This application claims the benefit of priority of Korean Patent Application No. 10-2012-0036885 filed on Apr. 9, 2012, all of which are incorporated by reference in their entirety herein.

BACKGROUND OF THE INVENTION

1. Field of the Invention

The present invention relates to a multi-input multi-output (MIMO) system, and more particularly, to a method and apparatus for allocating transmission power in an MIMO system.

2. Related Art

A multi-antenna technology (or a multi-input multi-output (MIMO) system), which is a technology of improving efficiency and performance of a frequency, has been variously applied to mobile telecommunication and wireless local area network (WLAN). A beamforming technology among the multi-antenna technologies is a technology in which a station transmitting a signal forms and transmits a beam so as to improve packet reception performance of a station receiving the signal using transmission channel information.

In a single user (SU) multi-antenna technology, the beamforming technology allows all transmission streams to be received in a single station, and in a multi-user (MU) multi-antenna technology, the beamforming technology allows the transmission streams to be received in several stations.

In a multi-user multi-antenna scheme, generally, since multiple streams are transmitted simultaneously to a multi-user using the same communication resource, sum capacity of transmission rates capable of being reached in a multi-user environment may be obtained. Therefore, the multi-user multi-antenna scheme has been spotlighted.

In the multi-antenna technology, power appropriate for each transmit antenna is allocated to each transmit antenna, thereby making it possible to increase channel capacity, which is referred to as a power allocation method. Particularly, in the single user multi-antenna technology, it has been known that a power allocation method called a water-filling method is used to allocate high power when a channel is in a good state and allocate low power when the channel is in a bad state, thereby making it possible to obtain optimal channel capacity.

However, in the multi-user multi-antenna technology, in the case in which optimal power is allocated to each user in a situation in which crosstalk is present between users, a non-convex optimization problem occurs. Therefore, a method of solving this problem has been demanded.

SUMMARY OF THE INVENTION

The present invention provides a method and apparatus for allocating transmission power in a system having a plurality of antennas.

The present invention also provides a method and apparatus for allocating transmission power in consideration of stream interference in a user in the case in which a receiver having a plurality of antennas receives a plurality of streams.

In an aspect, a method for allocating transmission power in a transmission terminal having at least one antenna of a multi-input multi-output (MIMO) system is provided. The method includes: measuring inter-stream interference of a plurality of streams; measuring inter-user interference of a plurality of users; and determining the transmission power based on the inter-stream interference and the inter-user interference, wherein the transmission power is determined using an iterative water-filling algorithm in which the Karush-Kuhn-Tucker (KKT) system is iteratively applied to all of the plurality of streams and all of the plurality of users.

The method may further include updating the inter-stream interference and the inter-user interference based on the determined transmission power.

The method may further include updating the transmission power based on the updated inter-stream interference and inter-user interference.

The update may be repeated until the transmission power converges to a specific value.

The transmission power may be determined to be a maximum value calculated by partially differentiating the Lagrangian equation.

The Lagrangian equation may be determined based on signal to interference and noise ratios (SINRs) of each of the streams of each of the plurality of users.

The method may further include determining the Lagrange multiplier indicating a level of the water-filling algorithm based on the inter-stream interference and the inter-user interference, wherein the transmission power is determined based on the Lagrange multiplier.

The Lagrange multiplier may be determined in a 1-dimensional search scheme.

The 1-dimensional search scheme may be a bisection method.

The inter-stream interference of the plurality of streams may be measured while increasing each stream coefficient by 1.

The inter-user interference of the plurality of users may be measured while increasing each user coefficient by 1.

In another aspect, a transmitter for allocating transmission power to a receiver having at least one antenna in an MIMO system is provided. The transmitter includes: a stream interference measuring unit measuring inter-stream interference of a plurality of streams; a user interference measuring unit measuring inter-user interference of a plurality of users; and a transmission power allocating unit determining the transmission power based on the inter-stream interference and the inter-user interference, wherein the transmission power allocating unit determines the transmission power using an iterative water-filling algorithm in which the KKT system is iteratively applied to all of the plurality of streams and all of the plurality of users.

The stream interference measuring unit may update the inter-stream interference based on the determined transmission power, and the user interference measuring unit may update the inter-user interference based on the determined transmission power.

The transmission power allocating unit may update the transmission power based on the updated inter-stream interference and inter-user interference.

The transmission power allocating unit may repeat the update until the transmission power converges to a specific value.

The transmission power allocating unit may determine the transmission power using a maximum value calculated by partially differentiating the Lagrangian equation.

The Lagrangian equation may be determined based on SINRs of each of the streams of each of the plurality of users.

The transmitter may further include a multiplier determining unit determining the Lagrange multiplier indicating a level of the water-filling algorithm based on the inter-stream interference and the inter-user interference, wherein the transmission power allocating unit determines the transmission power based on the Lagrange multiplier.

The Lagrange multiplier may be determined in a 1-dimensional search scheme.

The 1-dimensional search scheme may be a bisection method.

DESCRIPTION OF EXEMPLARY EMBODIMENTS

Figure 1:
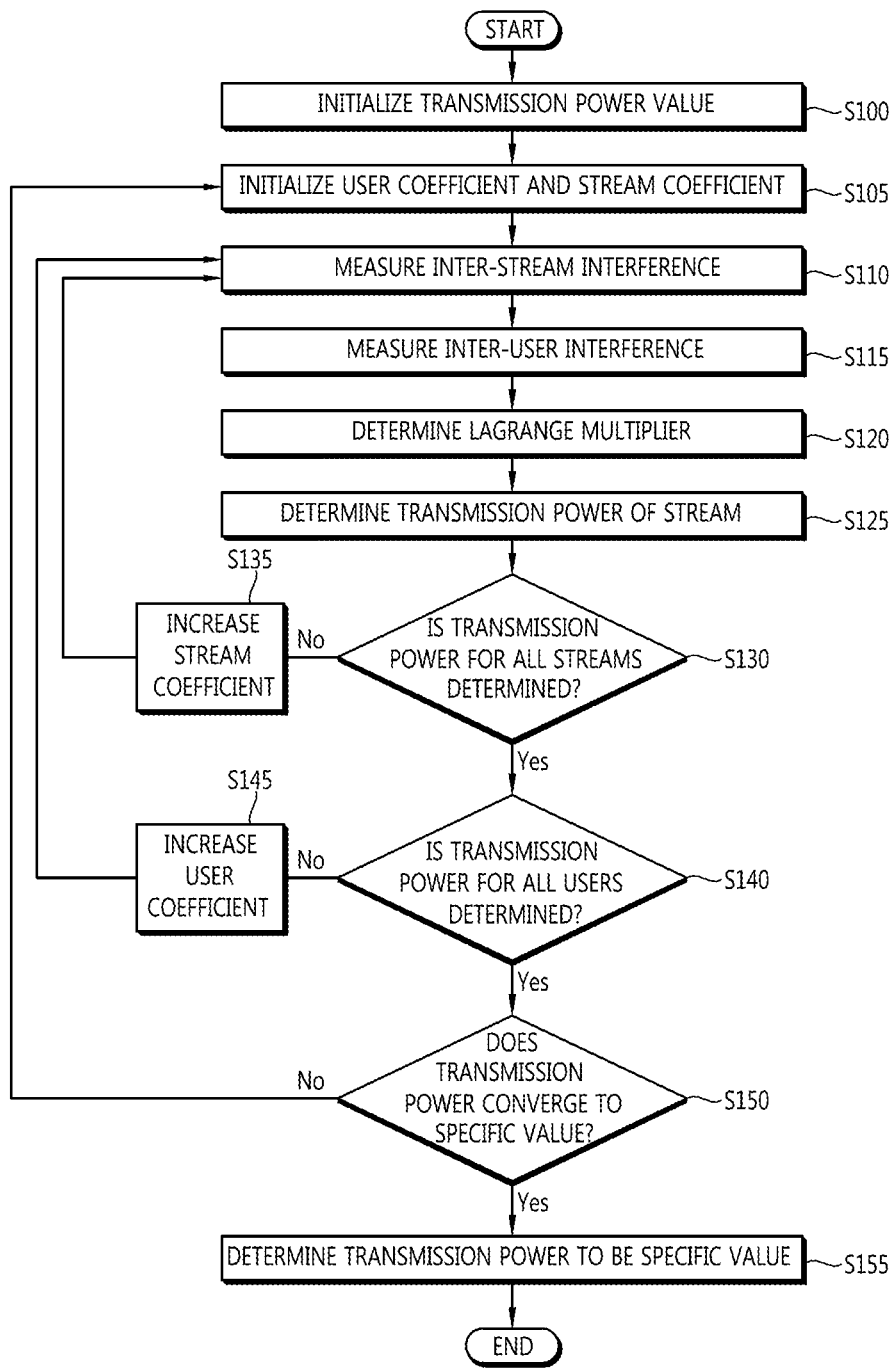
FIG. 1 is a flow chart showing an example of a method for allocating an optimal value of transmission power in a user transmission terminal, according to an exemplary embodiment of the present invention.

Hereinafter, exemplary embodiments of the present invention will be described in detail with reference to the accompanying drawings so that those skilled in the art may easily practice the present invention. However, the present invention may be implemented in various different ways and is not limited to the exemplary embodiments provided in the present description. In addition, portions unrelated to the present invention will be omitted in the accompanying drawing in order to clearly disclose the present invention, and the same or similar reference numerals will be used to describe the same or similar components.

A reception signal in a multi-user multi-input multi-output (MU-MIMO) system for an access point (AP) having N transmit antennas and K users each having M receive antennas may be represented by the following Equation 1.

$$y = \begin{bmatrix} y_1 \\ \vdots \\ y_K \end{bmatrix} = \begin{bmatrix} H_1 \\ \vdots \\ H_K \end{bmatrix} [W_1, \ldots, W_K] \begin{bmatrix} \sqrt{P_1}\, x_1 \\ \vdots \\ \sqrt{P_K}\, x_K \end{bmatrix} + n \quad \text{[Equation 1]}$$

Here, $y_k$ indicates a (M×1) reception signal vector of a user k. $H_k$ indicates a channel matrix between the N transmit antennas of the AP and the M receive antenna of the user k. $W_k$ indicates a (N×M) precoding matrix of the user k for MU-MIMO precoding, and $x_k$, which is a transmission signal for the user k, indicates a (M×1) vector. n indicates white complex Gaussian noise having power $\sigma^2$ for each receive antenna. Here, $P_k$ indicates transmission power of the user k, and a restrictive condition of $$"\sum_{k=1}^{K}\sum_{j=1}^{M} P_{kj} \le P_T"$$

(here, j indicates a stream) with respect to the sum $P_T$ of powers needs to be satisfied.

In the MU-MIMO system, channels of the user k for transmitting an MU-MIMO precoded signal are expressed as effective channel $H_k[W_1, \ldots, W_k]$, and crosstalk occurs due to interference $(H_k W_{k'})$ of other users k' (here, k'≠k). Here, the crosstalk means interference by signals other than a desired signal, more specifically, interference generated since the user k simultaneously receives his/her signal and a signal $(H_k W_k x_{k'})$ of other users k' input to his/her channel.

In this case, in order to maximize a reception rate of the system, mutual information in an interference environment needs to be maximized. A capacity region in an interference channel is not yet solved. However, since the crosstalk is not very large in an actual wireless environment, the crosstalk is generally regarded as noise.

In the present invention, it is assumed that an optimal receiver is used. For convenience of explanation, when it is assumed that the number of receive antennas of each user is 2, the reception signal ($y_k$) of the user k may be represented by the following Equation 2.

$$y_k = \sqrt{P_{k1}}\, H_k w_{k1} x_{k1} + \sqrt{P_{k2}}\, H_k w_{k2} x_{k2} + \sum_{k' \ne k}^{K} \left( \sqrt{P_{k'1}}\, H_k w_{k'1} x_{k'1} + \sqrt{P_{k'2}}\, H_k w_{k'2} x_{k'2} \right) + n_k \quad \text{[Equation 2]}$$

Here, $W_k=[w_{k1},w_{k2}]$. In the above Equation 2, "$\sqrt{P_{k1}}H_k w_{k1} x_{k1}+\sqrt{P_{k2}}H_k w_{k2} x_{k2}$" indicates a signal that the user k is to receive, and other terms indicate interference signals that have been transmitted to users other than the user k but have been unintentionally received by the user k.

When it is assumed that an effective channel ($g_{klj}$) of a j-th stream of the user k is "$H_k w_{lj}$" (here, k=1, ..., K, l=1, ..., K (l indicates all users (including the user k)), and j=1,2), a signal to interference and noise ratio (SIRN) of each reception stream of the user k is represented by the following Equation 3.

$$SINR(k, j) = \frac{P_{kj}|g_{kkj}|^2}{P_{kj'}|g_{kkj'}|^2 + I_k} \quad \text{[Equation 3]}$$

Here, $P_{kj'}|g_{kkj}|^2$ indicates interference power of other streams in the user. $I_k$ indicates the sum of interference power of other users and noise power and is represented by the following Equation 4.

$$I_k = \sum_{l \ne k}^{K} (P_{l1}|g_{kl1}|^2 + P_{l2}|g_{kl2}|^2) + 2\sigma^2 \quad \text{[Equation 4]}$$

An optimization problem of power allocation for each user in a situation in which interference of other users and inter-stream interference are present is a non-convex optimization problem, which is solved by iteratively applying the Karush-Kuhn-Tucker (KKT) system. Unlike a spectrum optimization problem of single-user multi-input multi-output (SU-MIMO) which is a convex problem capable of being analytically solved, since a spectrum optimization problem of MU-MIMO is a non-convex problem due to interference of other users, it is solved by a numerical access. The KKT system is one of repetitive water-filling correction methods for effectively finding an optimal solution.

The present invention relates to an optimization method for regarding interference of other users and inter-stream interference as noise and maximizing sum capacity for K users each having two receive antennas, which is represented by the following Equation 5.

$$\max_{P_k} \sum_{k=1}^{K} \sum_{j=1}^{2} C(P_{kj}) \qquad \text{[Equation 5]}$$

$$\text{s.t.} \sum_{k=1}^{K} (P_{kj} + P_{kj'}) \leq P_T,$$

$$(k = 1, \ldots, K, j = 1, 2(j' \neq j))$$

$$P_k \geq 0, (k = 1, \ldots, K)$$

where $$C(P_{kj}) = \log_2(1 + SINR(k, j)), (k = 1, \ldots, K, j = 1, 2)$$

Here, $C(P_{kj})$ means capacity and is indicated by a function of $P_{kj}$.

The above Equation 5 is optimized using the Lagrangian equation. When the Lagrangian equation is used, a maximum value or a minimum value may be found under a restrictive condition.

$$J(C(P_{kj}), \lambda) = \qquad \text{[Equation 6]}$$

$$\sum_{k=1}^{K} \sum_{j=1}^{2} \log_2(1 + SINR(k, j)) - \lambda \left( \sum_{k=1}^{K} \sum_{j=1}^{2} P_{kj} - P_T \right)$$

Here, $\lambda$ indicates the Lagrange multiplier.

When the above Equation 6 is differentiated with respect to $P_{kj}$ and a solution of "$(\partial J)/(\partial P_{kj})=0$" is found using the above Equations 3 and 4, the following Equation 7 is provided.

$$\frac{1}{\ln 2} \frac{1}{P_k + P_{kj'} \frac{|g_{kkj'}|^2}{|g_{kkj}|^2} + \frac{I_k}{|g_{kkj}|^2}} = \frac{1}{\lambda + f_{kj}} \qquad \text{[Equation 7]}$$

Here, $g_{kkj}$ indicates an effective channel of a j-th stream of the user k as in the above Equation 2, and $g_{kkj}'$ indicates an effective channel of interference of other streams that has an influence on a j-th ($\neq$j') stream of the user k.

Here, $f_{kj}$, which is a term indicating an influence by interference of other users, is represented by the following Equation 8.

$$f_{kj} = \qquad \text{[Equation 8]}$$

$$\sum_{k' \neq k}^{K} \frac{1}{(P_{k'1}|g_{k'k'1}|^2 + P_{k'2}|g_{k'k'2}|^2) + I_{k'}} \frac{P_{k'j}|g_{k'k'j}|^2|g_{kk'j}|^2}{P_{k'j'}|g_{k'k'j'}|^2 + I_{k'}}$$

The above Equations 7 and 8 are the KKT system having the restrictive condition of the above Equation 5 and are iteratively applied, thereby making it possible to find a solution.

First, interference terms of other streams and interference terms of other users are fixed and $\lambda$ and $P_{kj}$ are found, through an inner loop by an iterative water-filling algorithm. Then, according to a newly found $P_{kj}$, a process of updating $f_{kj}$ and $I_k$ terms is iteratively performed until the $P_{kj}$ converges, such that the solution is obtained.

In the above Equation 7, a $\lambda$ term indicating a level of the water-filling algorithm has a form in which it is modified by $f_{kj}$, and a process similar to the water-filling is performed in order to obtain $P_{kj}$, which is called an iterative water-filling algorithm.

First, with respect to a given $\lambda$, $P_{kj}$ is obtained as represented by the following Equation 9.

$$P_{kj} = \left[ \frac{1}{\lambda + f_{kj}} - \left( \frac{I}{|g_{kkj}|^2} + P_{kj'} \frac{|g_{kkj'}|^2}{|g_{kkj}|^2} \right) \right]^+ \qquad \text{[Equation 9]}$$

Here, "k=1, ..., K" and "j=1,2(j≠j')".

In addition, $[a]^+$ is max $\{0, a\}$.

Next, in order to find $\lambda$, the restrictive condition as represented by the following Equation 10 from the above Equation 5 is used.

$$P_T = \sum_{k=1}^{K} \sum_{j(\neq j')=1}^{2} \left[ \frac{1}{\lambda + f_{kj}} - \left( \frac{I_k}{|g_{kkj}|^2} + P_{kj'} \frac{|g_{kkj'}|^2}{|g_{kkj}|^2} \right) \right]^+ \qquad \text{[Equation 10]}$$

The above Equation 10 is an equation of a single variable $\lambda$. When $f_{kj}$ and interference terms ($I_k$) are fixed, since a right term of the above Equation 10 is a monotonic function for $\lambda$, a $\lambda$ value may be found in a 1-dimensional search scheme such as a bisection method.

In the case in which the $\lambda$ value is found, an optimal $P_{kj}$ may be found from the above Equation 9. After the optimal ($\hat{P}_{kj}$, $\lambda$) for the stream j of the user k is obtained through the above-mentioned process, this process is iteratively applied to other streams j' and other users. The exemplary embodiment of the present invention may be applied even in the case in which j is larger 2.

FIG. 1 is a flow chart showing an example of a method for allocating an optimal value of transmission power in a user transmission terminal, according to an exemplary embodiment of the present invention.

Referring to FIG. 1, a transmission terminal initializes a transmission power value to $P_T/2K$ (S100). Here, K indicates the number of users, and $P_T$ indicates the sum of allocation powers. Then, a user coefficient (k) and a stream coefficient (j) are initialized (S105).

The transmission terminal measures interference between a stream j and other streams (S110). At this time, the above Equation 4 may be used.

The transmission terminal measures interference between a user k and other users (S115). At this time, the above Equation 8 may be used.

The Lagrange multiplier ($\lambda$) is determined from the Lagrangian equation by fixing the interference with other streams and the interference with other users (S120). At this time, the above Equation 10 may be used.

Transmission power ($P_{kj}$) is determined based on the Lagrange multiplier (S125). At this time, the above Equation 9 may be used.

The transmission power is determined by repeating a process of S110 to S125 for all streams of each user (S130). For example, the stream coefficient (j) may be increased by one in order to determine the transmission power for other streams (S135).

Each transmission power is determined by repeating a process of S110 to S125 for all users (S140). For example, the user coefficient (k) may be increased by one in order to determine the transmission power for other users (S145).

A process of S105 to S140 is repeated until the determined transmission power value converges to a specific value (S150). When the transmission power value converges to a specific value, this specific value is determined to be an optimal value of transmission power of the user (S155).

Figure 2:
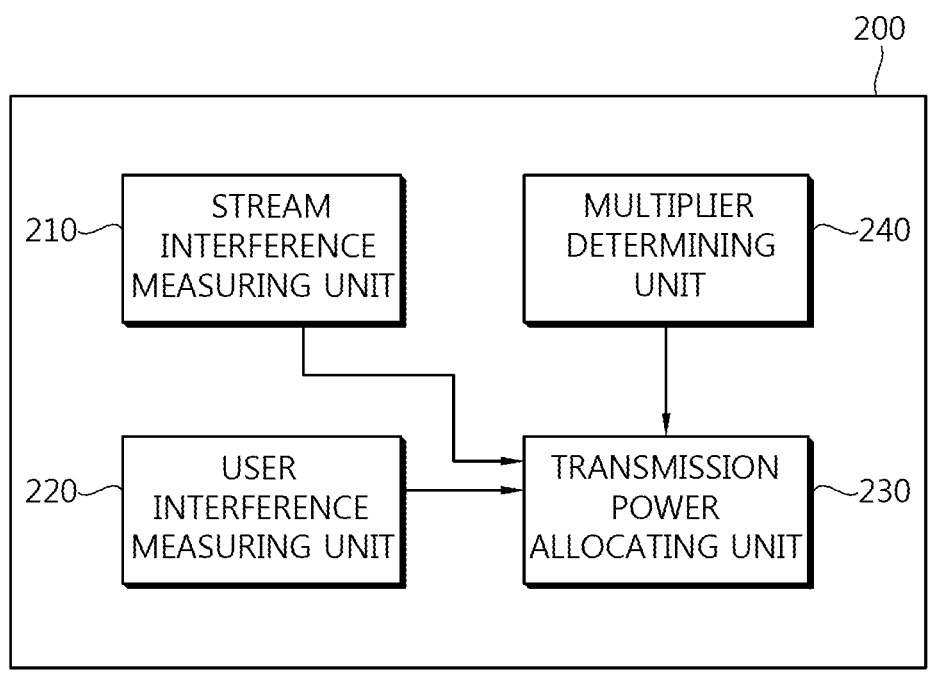
FIG. 2 is a block diagram showing an example of a transmission power allocating apparatus allocating transmission power in consideration of stream interference in a user in the case of receiving a plurality of streams and having a plurality of antennas, according to the exemplary embodiment of the present invention.

FIG. 2 is a block diagram showing an example of a transmission power allocating apparatus allocating transmission power in consideration of stream interference in a user in the case of receiving a plurality of streams and having a plurality of antennas, according to the exemplary embodiment of the present invention. The transmission power allocating apparatus is a transmitter.

Referring to FIG. 2, the transmission power allocating apparatus 200 includes a stream interference measuring unit 210 measuring inter-stream interference of a plurality of streams, a user interference measuring unit 220 measuring inter-user interference of a plurality of users, and a transmission power allocating unit 230 determining transmission power based on the inter-stream interference and the inter-user interference.

The stream interference measuring unit 210 may update the inter-stream interference based on the determined transmission power. In this case, the stream interference measuring unit 210 may update the inter-stream interference using the above Equation 4.

The user interference measuring unit 220 may update the inter-user interference based on the determined transmission power. In this case, the user interference measuring unit 220 may update the inter-user interference using the above Equation 8.

The transmission power allocating unit 230 determines the transmission power using an iterative water-filling algorithm in which the KKT system is iteratively applied to all of the plurality of streams and all of the plurality of users.

The transmission power allocating unit 230 may update the transmission power based on the updated inter-stream interference and inter-user interference.

The transmission power allocating unit 230 may repeat the update until the transmission power converges to a specific value.

The transmission power allocating unit 230 may determine the transmission power using a maximum value calculated by partially differentiating the Lagrangian equation. The Lagrangian equation may be determined based on SINRs of each of the streams of each of the plurality of users.

The transmission power allocating apparatus 200 may further include a multiplier determining unit 240 determining the Lagrange multiplier indicating a level of the water-filling algorithm based on the inter-stream interference and the inter-user interference. In this case, the multiplier determining unit 240 may determine the Lagrange multiplier using the above Equation 10.

The transmission power allocating unit 230 may determine the transmission power based on the Lagrange multiplier. The Lagrange multiplier may be determined in a 1-dimensional search scheme which may be a bisection method. In this case, the transmission power allocating unit 230 may determine the transmission power using the above Equation 9.

As set forth above, according to the exemplary embodiments of the present invention, several receive antennas are mounted in the MIMO system, thereby making it possible to receive multiple streams.

According to the exemplary embodiments of the present invention, when the multiple streams are received, transmission power may be allocated to each transmission stream.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. A method for allocating transmission power in a transmission terminal having at least one antenna of a multi-input multi-output (MIMO) system, the method comprising:
    measuring inter-stream interference of a plurality of streams of each user of a plurality of users;
    measuring inter-user interference of the plurality of users; and
    determining the transmission power based on the inter-stream interference and the inter-user interference,
    wherein the transmission power is determined using an iterative water-filling algorithm in which the Karush-Kuhn-Tucker (KKT) system is iteratively applied to all of the plurality of streams of all of the plurality of users.

2. The method of claim 1, further comprising updating the inter-stream interference and the inter-user interference based on the determined transmission power.

3. The method of claim 2, further comprising updating the transmission power based on the updated inter-stream interference and inter-user interference.

4. The method of claim 3, further comprising repeating the steps of claim 3 until the transmission power converges to a specific value.

5. The method of claim 1, wherein the transmission power is determined to be a maximum value calculated by partially differentiating a Lagrangian equation.

6. The method of claim 5, wherein the Lagrangian equation is determined based on signal to interference and noise ratios (SINRs) of each of the streams of each of the plurality of users.

7. The method of claim 6, further comprising determining a Lagrange multiplier indicating a level of the water-filling algorithm based on the inter-stream interference and the inter-user interference,
    wherein the transmission power is determined based on the Lagrange multiplier.

8. The method of claim 7, wherein the Lagrange multiplier is determined in a 1-dimensional search scheme.

9. The method of claim 8, wherein the 1-dimensional search scheme is a bisection method.

10. The method of claim 1, further including:

determining a transmission power of a first stream of the plurality of streams;

measuring the inter-stream interference of the plurality of streams a second time after determining the transmission power of the first stream; and determining a transmission power of a second stream of the plurality of streams using the second measurement of the inter-stream interference.

11. The method of claim 10, further including:

measuring the inter-user interference of the plurality of users a second time after determining the transmission power of the first stream; and determining the transmission power of the second stream using the second measurement of the inter-user interference.

* * * * *